(12) United States Patent
Schluter

(10) Patent No.: US 10,900,241 B2
(45) Date of Patent: Jan. 26, 2021

(54) UNCOUPLING MAT

(71) Applicant: Werner Schluter, Iserlohn (DE)

(72) Inventor: Werner Schluter, Iserlohn (DE)

(73) Assignee: Schluter Systems L.P., Plattsburgh, NY (US)

( * ) Notice: Subject to any disclaimer, the term of this patent is extended or adjusted under 35 U.S.C. 154(b) by 0 days.

(21) Appl. No.: 15/914,223

(22) Filed: Mar. 7, 2018

(65) Prior Publication Data
US 2019/0078337 A1    Mar. 14, 2019

(30) Foreign Application Priority Data

Mar. 9, 2017    (DE) .................... 20 2017 101 349 U

(51) Int. Cl.
| | |
|---|---|
| *E04C 2/20* | (2006.01) |
| *E04F 15/18* | (2006.01) |
| *E04C 2/32* | (2006.01) |
| *E04C 2/26* | (2006.01) |

(52) U.S. Cl.
CPC .............. *E04F 15/185* (2013.01); *E04C 2/20* (2013.01); *E04C 2/32* (2013.01); *E04F 15/182* (2013.01); *E04F 15/186* (2013.01); *E04C 2/26* (2013.01); *E04F 15/18* (2013.01)

(58) Field of Classification Search
CPC ....... E04F 15/18; E04F 15/185; E04F 15/182; E04F 15/186; E04C 2/32; E04C 2/26; E04C 2/324; E04C 2/326; E04C 2/322
See application file for complete search history.

(56) References Cited

U.S. PATENT DOCUMENTS

| | | | |
|---|---|---|---|
| 3,888,087 A | 6/1975 | Bergsland | |
| 4,318,258 A * | 3/1982 | Heck | E04B 1/80 428/159 |
| 4,574,541 A * | 3/1986 | Raidt | E02D 31/02 52/169.5 |
| 4,576,221 A * | 3/1986 | Fennesz | F24D 3/14 165/49 |
| 4,840,515 A | 6/1989 | Freese | |
| 5,042,569 A * | 8/1991 | Siegmund | F24D 3/142 165/56 |
| 5,052,161 A * | 10/1991 | Whitacre | E04F 15/18 52/385 |

(Continued)

FOREIGN PATENT DOCUMENTS

| | | |
|---|---|---|
| DE | 3701414 A1 | 7/1998 |
| DE | 19750277 A1 | 5/1999 |

(Continued)

OTHER PUBLICATIONS

European Search Report Application No. 18151856.4 dated Oct. 29, 2018, 12 pages.

*Primary Examiner* — Phi D A
(74) *Attorney, Agent, or Firm* — Jason Jones

(57) ABSTRACT

An uncoupling mat (1) includes a flexible plastic layer (2) made of a film-like plastic with structuring that defines indentations (6) provided with undercuts (5) on the first side (4) and cavities (8) positioned between the indentations (6) on the opposite second side (7). A fleece or fabric (3) is securely connected to the second side (7) and covers the cavities (8). The plastic layer (2) is provided with a plurality of weakening zones (12) which extend continuously between opposing side edges of the plastic layer (2).

20 Claims, 4 Drawing Sheets

(56) References Cited

U.S. PATENT DOCUMENTS

| | | | | |
|---|---|---|---|---|
| 5,489,462 | A | * | 2/1996 | Sieber ................. E02D 31/02 |
| | | | | 405/38 |
| 5,566,522 | A | * | 10/1996 | Ålander et al. .......... E04B 5/40 |
| | | | | 428/183 |
| 5,743,330 | A | * | 4/1998 | Bilotta ................. F24D 3/141 |
| | | | | 165/183 |
| 6,434,901 | B1 | * | 8/2002 | Schluter ............... E02D 5/801 |
| | | | | 52/302.1 |
| 7,014,390 | B1 | | 3/2006 | Morris |
| 7,493,738 | B2 | * | 2/2009 | Bui ...................... E04C 2/06 |
| | | | | 52/578 |
| 8,888,067 | B1 | * | 11/2014 | Calmes ............... B28B 7/0073 |
| | | | | 249/15 |
| 8,955,278 | B1 | * | 2/2015 | Mills .................... E04B 5/48 |
| | | | | 52/302.3 |
| 9,328,520 | B1 | * | 5/2016 | Kriser ................ E04F 15/182 |
| 2004/0074631 | A1 | * | 4/2004 | Jeon .................... F24D 3/142 |
| | | | | 165/53 |
| 2005/0229520 | A1 | * | 10/2005 | Julton ................. E04F 13/04 |
| | | | | 52/443 |
| 2014/0069039 | A1 | | 3/2014 | Schluter et al. |

FOREIGN PATENT DOCUMENTS

| | | |
|---|---|---|
| DE | 29924180 U1 | 5/2002 |
| DE | 202011/110801 | 6/2016 |
| EP | 1073813 B2 | 2/2001 |
| EP | 3128103 A1 | 2/2017 |
| WO | WO 99/54571 A1 | 10/1999 |
| WO | WO 2015/161888 A1 | 10/2015 |

* cited by examiner

UNCOUPLING MAT

PRIORITY CLAIM

This application claims priority of and to German Patent Application Serial No. 20 2017 101 349.9, filed Mar. 9, 2017, which is hereby incorporated herein by reference in its entirety for all purposes.

BACKGROUND OF THE INVENTION

Uncoupling mats are used to uncouple a substrate and a slab covering laid over the latter in terms of stress such that the transmission of stresses that develop in particular within the substrate to the slab covering is prevented. In this manner, the development of cracks in the slab covering or the detachment of individual tiles can be prevented.

BRIEF SUMMARY OF THE TECHNOLOGY

In accordance with one aspect of the invention, an uncoupling mat is provided, including a flexible plastic layer made of a film-like plastic with structuring that defines indentations provided with undercuts on the first side and cavities positioned between the indentations on the opposite second side, and a fleece or fabric securely connected to the second side and covering the cavities. The mat can be characterised in that the plastic layer can be provided with a plurality of weakening zones which extend continuously between opposing side edges of the plastic layer.

In accordance with another aspect of the invention, an uncoupling mat is provided, including a plastic layer made of film-like plastic with structuring that defines indentations provided with undercuts on the first side and cavities positioned between the indentations on the opposite second side, and a fleece or fabric securely connected to the second side and covering the cavities, in particular an uncoupling mat according to any of the preceding claims, characterised in that the cross-section of the indentations in at least some corner regions increases towards the first side, in particular increases constantly, preferably from the bottom of the corresponding indentation.

BRIEF DESCRIPTION OF THE SEVERAL VIEWS OF THE DRAWINGS

Further features and advantages of the present invention become clear from the following description of embodiments of uncoupling mats according to the invention with reference to the attached drawings. These show as follows.

DETAILED DESCRIPTION OF THE INVENTION

Figure 1:
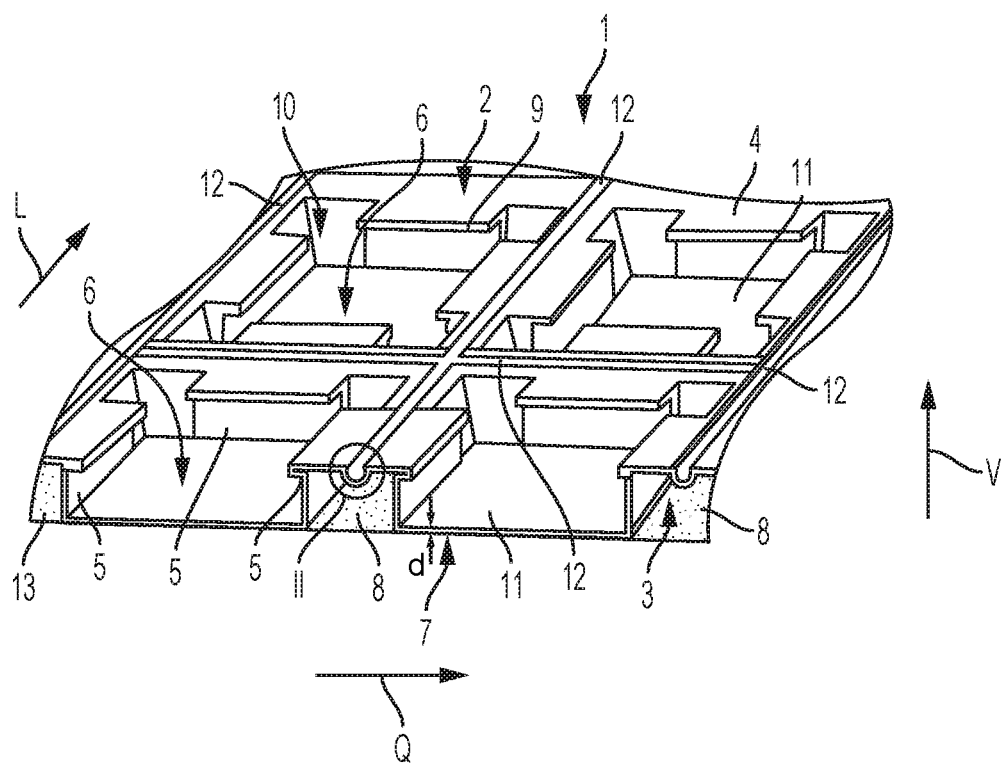
FIG. 1 a schematic perspective partial view of an uncoupling mat according to a first embodiment of the present invention.
Figure 2:
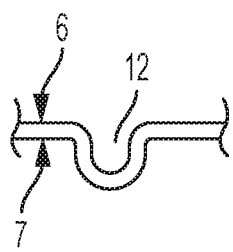
FIG. 2 an enlarged side view of the portion provided with reference sign II in FIG. 1 and which shows a weakening zone.
Figure 3:
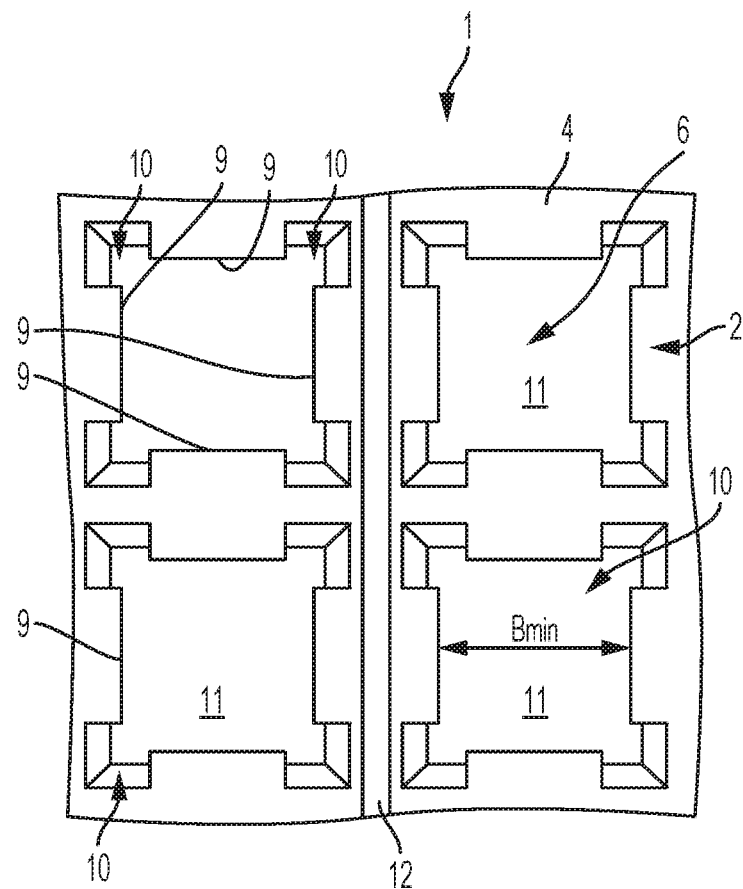
FIG. 3 a top view of the arrangement shown in FIG. 1.
Figure 4:
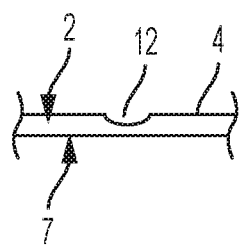
FIG. 4 a view similar to FIG. 2, which shows an alternative embodiment of a weakening zone.

The present invention relates generally to an uncoupling mat comprising a flexible plastic layer made of a film-like plastic with structuring that defines indentations provided with undercuts on the first side and cavities positioned between the indentations on the opposite second side, and a fleece or fabric securely connected to the second side and covering the cavities.

Uncoupling mats of the type specified are used to uncouple a substrate and a slab covering laid over the latter in terms of stress such that the transmission of stresses that develop in particular within the substrate to the slab covering is prevented. Thus, the development of cracks in the slab covering or the detachment of individual tiles can be prevented. For this purpose, in a first step uncoupling mats are normally fastened to the substrate using an adhesive that grips in the fleece or fabric. The adhesive can be, for example, a thin bed mortar, a reaction resin mortar or the like, reference only being made to thin bed mortar in the following for the sake of simplicity. In a further step the slab covering is then laid over the plastic layer of the uncoupling mat, once again using thin bed mortar, the thin bed mortar anchoring in the indentations provided with undercuts such as to form thin bed mortar stilts. In this way a secure connection between the substrate and the slab covering is achieved overall. Any stresses that are present within the substrate, caused for example by the remaining drying and curing process of the substrate, by the so-called settling of a construction, by temperature changes due to different thermal expansion coefficients of the materials used or the like, are then absorbed in the composite and compensated for by corresponding deformation of the uncoupling mats so that they can not be transmitted to the slab covering. The freedom of movement of the uncoupling mat required for this is provided by the cavities formed on the second side of the plastic layer. Reference is made in this connection, for example, to the uncoupling mats described in publications DE 37 01 414 A1 and EP 1 073 813 B2, to the entire disclosure of which reference is herewith made.

DE 37 01 414 A1 describes an uncoupling mat, the plastic layer of which has concertina-like structuring, the indentations defined on the first side as well as the cavities defined on the second side being in the form of dovetails, and each extending parallel to one another. In this way, due to the structure, the freedom of movement of the uncoupling mat required for the uncoupling is provided substantially in a direction transverse to the direction of the extension of the cavities.

In contrast, on the basis of DE 37 01 414 A1, EP 1 073 813 B2 proposes an uncoupling mat with a plastic layer the structuring of which has cavities that cross in a grid on the second side and indentations provided with undercuts and delimited by the cavities on the first side. With this uncoupling mat therefore, use is not made of the uncoupling principle brought about by the concertina-like structuring of the plastic layer described in DE 37 01 414 A1. Rather, in the uncoupling mat described in EP 1 071 813, one relies upon the extensibility of the film-like plastic to achieve the uncoupling effect which allows movement of the thin bed mortar stilts formed in the indentations in the direction of the cavities with deformation of the plastic layer.

Fundamentally, it is desirable to further improve the uncoupling capability of known uncoupling mats.

Furthermore, it is desirable to improve the clamping of the lower side of known uncoupling mats which is formed by the fleece or the fabric with a thin bed mortar.

In addition, one disadvantage of known uncoupling mats is that upon filling the indentations with a thin bed mortar, the air can often not completely escape from the indentations, and so air inclusions develop which form uncontrolled cavities within the mortar, and this is not desirable.

On the basis of this prior art it is an object of the present invention to devise an uncoupling mat of the type specified at the start with an alternative structure.

In order to achieve this object, the present invention devises an uncoupling mat of the type specified at the start which is characterised in that the plastic layer is provided with a plurality of weakening zones which extend continuously between opposing side edges of the plastic layer. In other words, the present invention proposes further improving the uncoupling capability of an uncoupling mat of the type described in EP 1 073 813 B2 by the formation of additional weakening zones. By means of the weakening zones the plastic layer is given structurally an additional possibility for movement substantially transversely to the direction of extension, in particular in a straight line, of the weakening zones which is supplemented by the freedom of movement provided by the cavities, as a result of which an uncoupling mat with clearly improved uncoupling capability is provided overall.

The weakening zones are preferably provided in the form of grooves, the grooves possibly having, for example, a semi-circular, semi-elliptical or a V-shaped or triangular cross-section. In this way the uncoupling mat according to the invention can be produced with a simple structure.

According to one embodiment of the present invention the plastic layer has a substantially constant thickness, the thickness being smaller in the region of the weakening zones. In this way, targeted weakening of the plastic layer is therefore brought about not only structurally, but also by a smaller thickness of the plastic layer in the region of the weakening zones.

Preferably, a first group of weakening zones extending parallel to one another is provided, which weakening zones extend in particular transversely to a longitudinal direction of the uncoupling mat, for example perpendicular to the longitudinal direction. If the uncoupling mat is formed longitudinally, i.e. rectangularly as viewed from above, with a shorter and a longer side edge, the longitudinal direction advantageously corresponds to the direction of extension of the longer side edge. In this way additional uncoupling is provided which compensates for stresses acting in particular substantially perpendicularly to the direction of extension of the first group of weakening zones.

Advantageously, a second group of weakening zones extending parallel to one another is provided which crosses the first group, in particular at a right angle. Accordingly, a further additional uncoupling effect is provided which in particular compensates for stresses acting substantially perpendicular to the direction of the extension of the second group of weakening zones. It should be clear that more than two groups of weakening zones extending parallel to one another, and which cross one another, may also be provided.

Advantageously, the weakening zones are arranged spaced apart from one another equally, the distances preferably being in the range of from 10 to 100 mm, in particular in the range of from 10 to 50 mm. It has been shown that these distances have a good uncoupling effect within the ranges specified.

Advantageously, the weakening zones each extend between two rows of indentations, i.e. not through the indentations themselves. Weakening zones can be formed here between each row of indentations. Alternatively however, it is also possible to provide weakening zones, for example, only between every second or third row of indentations.

In order to achieve the object specified at the start, the present invention furthermore devises an uncoupling mat of the type specified at the start which is characterised in that the fleece or fabric has through holes with a cross-section in the range of from 0.5 to 1.0 mm$^2$, in particular in the range of from 0.5 of 0.8 mm$^2$. Such small through holes with a cross-section within said range are characterised in that they allow the passage of thin bed mortar in the conventionally used consistency with the normal manual contact pressure of the uncoupling mats that is involved when they are being laid, whereupon the thin bed mortar can not only grip to the fleece or the fabric, but also behind the latter, clogging of the cavities that are essential for the uncoupling effect with thin bed mortar being reliably avoided however.

Furthermore, the present invention devises an uncoupling mat of the type specified at the start which is characterised in that the indentations have corner regions, the cross-section of the indentations in at least some corner regions increasing towards the first side, in particular constantly increasing, preferably from the bottom of the corresponding indentation. Corner regions configured in this way lead to air being able to escape well while thin bed mortar is being applied to the first side of the plastic layer of the uncoupling mat with an appropriate trowel, as a result of which air inclusions and the formation of uncontrolled cavities associated with the latter are able to be prevented, and good and consistent filling of the indentations with thin bed mortar are guaranteed.

According to a first version of the uncoupling mat according to the invention the cavities cross one another and define a grid- or net-like arrangement. In this way almost consistent and good uncoupling is guaranteed in all directions.

Advantageously, the uncoupling mat in this version has 100 to 3000 indentations per square metre, as a result of which the uncoupling function is also optimised.

According to a second version of the uncoupling mat according to the invention the indentations cross one another and define a grid- or net-like arrangement.

In this second version the uncoupling mat preferably has 100 to 3000 cavities per square metre, as a result of which the uncoupling function is optimised.

In the second version the cavities can at least partially have an annular cross-section. This means that additional recesses are formed on the opposite side, as a result of which the bearing capacity of an arrangement produced with the uncoupling mat is improved.

According to one embodiment of the present invention the indentations have a minimum width in the range of from 3 to 20 mm and a maximum height in the range of from 2 to 20 mm.

Turning now the figures, FIGS. 1 to 5 show an uncoupling mat 1 according to an embodiment of the present invention which has, as main components, a plastic layer 2 and a fleece or fabric 3, and which can be provided in a sheet or a roll.

The plastic layer 2 is produced from film-like plastic and has a substantially consistent thickness d which is normally in the range between 0.4 and 1.0 mm. Accordingly, the plastic layer 2 is extensible, i.e. it can be deformed manually. The plastic layer 2 is provided with structuring which on a first side 4, which in the correctly laid state of the uncoupling mat 1 forms the upper side, defines indentations 6 provided with undercuts 5, and on the opposite second side 7 defines cavities 8 arranged between the indentations 6, which cavities in the present case cross one another and form a grid-like arrangement. The indentations 6 provided in a regular arrangement preferably have a minimum width $B_{min}$ in the range of from 3 to 20 mm and a maximum height $H_{max}$ in the range of from 2 to 8 mm, their number being in particular 500 to 3000 per square metre. In this case the indentations 6 are substantially cuboid in form, the undercuts 5 each being formed by a projection 9 which projects into the indentation 6. However, it should be clear that the indentations 6 may also differ from the cuboid form, for example, as seen from above, they may also be hexagonal or octagonal, cross-shaped or circular in form. Likewise, the shape and number of the projections 9, and accordingly also of the undercuts 5 formed by the latter, may vary. Thus, the side walls which delimit the indentations 6 laterally may also simply have a corresponding incline to the vertical V (direction perpendicular to the bottom 11) in order to form the undercuts 5. The cross-section of the indentations 6 increases constantly in the corner regions 10 from the bottom 11 towards the first side 4. In the present case this is achieved by the inner edges defining the corner regions 10 being inclined accordingly with respect to the vertical V. A plurality of weakening zones 12 extend between the indentations 6, which weakening zones extend continuously and preferably in a straight line between opposing side edges of the plastic layer 2, in the present case perpendicular to the latter and parallel to one another. The weakening zones 12 are provided as grooves with a substantially semi-circular cross-section. Basically, however, the grooves may also have a cross-sectional form that differs from this, such as for example the form of a semi-ellipse, a triangle or the like. In the embodiment of the weakening zones 12 shown in FIG. 2, the thickness d is constant in relation to the thickness d of the other plastic layer 2. However, it may also be smaller, as shown by way of example in FIG. 4, as a result of which an additional weakening effect is achieved. The weakening zones 12 are spaced apart equally from one another, the distances preferably being in the range of from 10 to 100 mm, in particular in the range of from 10 to 50 mm. The weakening zones 12 may be formed here between each row of indentations 6. Alternatively however, they may also be provided only between every second or third row of indentations 6, to give just one example. The distances between the parallel weakening zones 12 in the longitudinal direction L and the transverse direction Q of the uncoupling mat 1 may also be different. Moreover, weakening zones 12 may also be formed only transversely to the longitudinal direction L or only transversely to the transverse direction Q.

The fleece or fabric 3 is connected securely to the second side 7 of the plastic layer 2 and accordingly covers the cavities 8 thereof. Thus, the fleece or fabric 3 may be laminated onto the second side 7 of the plastic layer 2, for example, or be adhered to the latter. The fleece or fabric 3 comprises regularly arranged through holes 13 with a cross-section in the range of from 0.5 to 1.0 mm², in particular in the range of from 0.5 to 0.8 mm².

Figure 5:
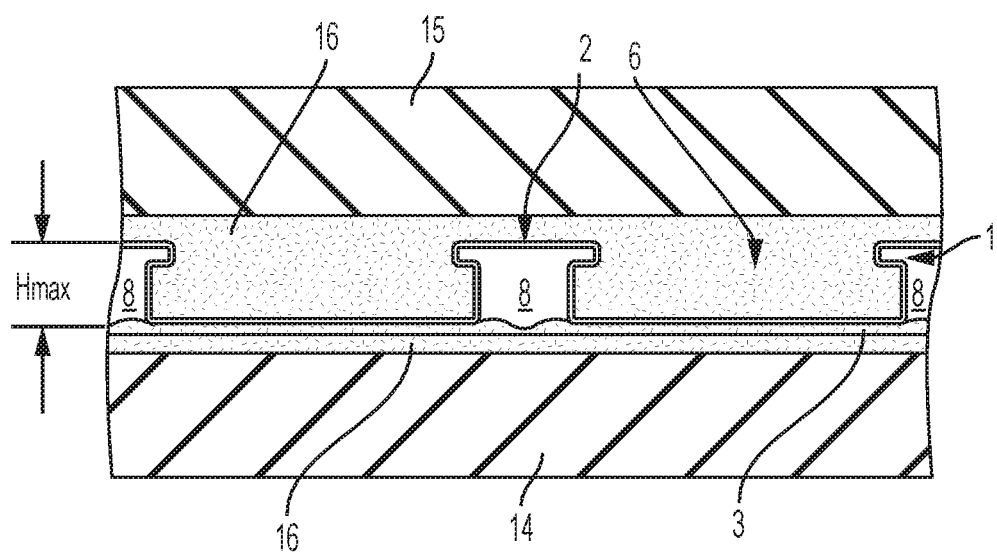
FIG. 5 a side view of the arrangement shown in FIG. 1 in the correctly laid state.

The uncoupling mat 1 serves to uncouple a substrate 14 and a slab covering 15 laid over the latter in terms of stress. In a first step, as shown in FIG. 5, it is fastened to the substrate 14 using a thin bed mortar 16. The thin bed mortar 16 is mostly applied to the substrate 14 here using a trowel and/or a toothed trowel, whereupon the uncoupling mat 1 is positioned and pressed onto the substrate. At this juncture the thin bed mortar grips in the fleece or fabric 3, as a result of which a first fixing is brought about. A fleece is advantageous in that it consists of a plurality of small individual threads which also project outwards, as a result of which a profound connection to the thin bed mortar 16 is achieved. In the case of a fabric, this should also have projecting individual threads in the manner of a fleece so as to also bring about the appropriate effect. By virtue of the chosen cross-section of the through holes 13, the latter are sufficiently large for the thin bed mortar 16 to penetrate the fleece or fabric 3 slightly, as a result of which further fixing is achieved by the anchoring of the thin bed mortar 16 behind the fleece or fabric 3, but they are also sufficiently small, and this reliably prevents the cavities 8 of the uncoupling mat 1 from completely clogging with thin bed mortar 16.

In a second step the slab covering 15, for example in the form of tiles, is then laid over the plastic layer 2 of the uncoupling mat 1, once again using thin bed mortar 16, the thin bed mortar 16 anchoring in the indentations 6 provided with undercuts 5. When distributing the thin bed mortar 16 over the plastic layer 2 with a trowel and/or a toothed trowel, it is ensured by virtue of the design of the corner regions 10 of the indentations 6 that any air that is present in the indentations 6 can escape without any problem, as a result of which the formation of cavities between the uncoupling mat 1 and the slab covering 15 is suppressed, and complete filling of the indentations 6 with thin bed mortar 16 is also guaranteed.

If stresses now occur in the substrate 14, caused for example by the remaining drying and curing process of the substrate 14, by the so-called settling of a construction, by temperature changes due to different thermal expansion coefficients of the materials used or the like, these stresses are thus absorbed and compensated for by corresponding deformation of the uncoupling mat 1 so that they can not be transmitted to the slab covering 15. The freedom of movement of the uncoupling mat 1 required for this is on the one hand provided by the cavities 8 formed on the second side 7 of the plastic layer 2, which cavities allow movement of the thin bed mortar stilts formed in the indentations 6 in the direction of the cavities 8. On the other hand, the weakening zones 12 enable expansion and/or compression of the plastic layer, in each case respectively perpendicular to the direction of extension of the weakening zones 12, as a result of which additional uncoupling is provided.

Figure 6:
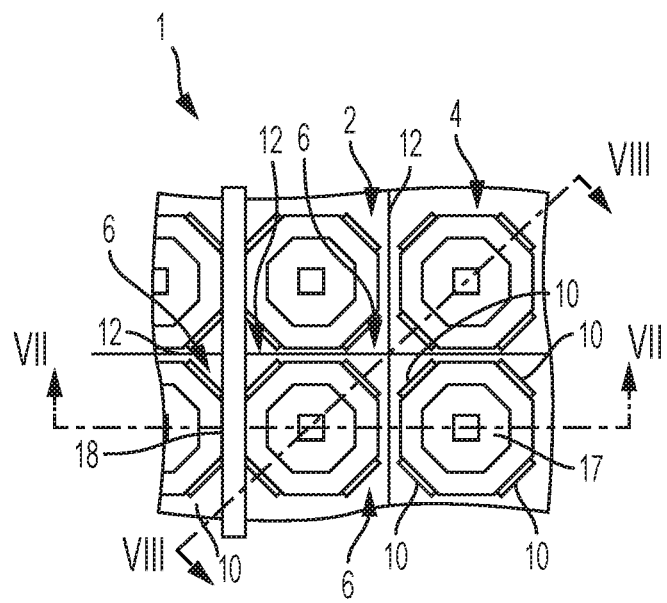
FIG. 6 a schematic top view of an uncoupling mat according to a second embodiment of the present invention.
Figure 7:
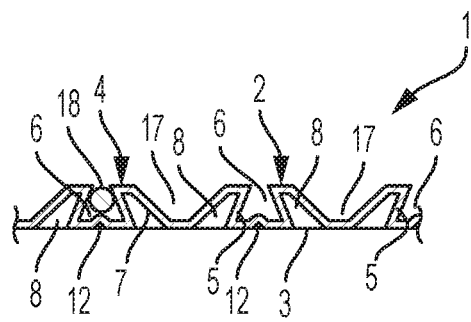
FIG. 7 a cross-sectional view along line VII-VII in FIG. 6.
Figure 8:
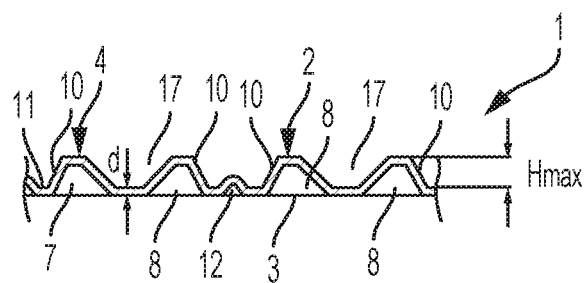
FIG. 8 a cross-sectional view along line VIII-VIII in FIG. 6.

FIGS. 6 to 8 show an uncoupling mat 1 according to a second embodiment of the present invention which also has, as main components, a plastic layer 2 and a fleece or fabric 3. The uncoupling mat 1 according to the second embodiment only differs from the previously described embodiment with regard to the structuring of the plastic layer 2. In the present case the structuring defines on the first side 4, which in the correctly laid state of the uncoupling mat 1 forms the upper side, indentations 6 provided with undercuts 5, which indentations are made in the form of channels and form a grid-like arrangement. On the opposite second side 7 the structuring defines cavities 8 arranged between the indentations 6, which cavities in this case are in an octagonal annular form so that a recess 17 develops in the middle of an annular cavity 8 on the first side 4. The indentations 6 have a cross-section which is adapted to the diameter of a cable 18, in particular a heating cable, such that the cable 18 can be held, clamped in the indentations 6, as shown by way of example in FIGS. 6 and 7. The weakening zones 12 extend in the middle of the indentations 6 in the longitudinal and transverse direction of the uncoupling mat 1, which weakening zones in the present case are formed similarly to the weakening zone 12 shown in FIG. 2, only that they are curved upwards and not downwards. It should be pointed out that the form of the indentations 6 and cavities 8 may vary. Thus, the cavities may also have a form that differs from an octagonal annular form, to give just one example.

It should be clear that the embodiments described above only serve as examples, and they are in no way to be understood to be restrictive. In fact, changes and/or modifications are possible, without straying from the scope of protection of the present application which is defined by the attached claims. In particular, individual features of the embodiments that are described may be substituted.

LIST OF REFERENCE SIGNS 1 uncoupling mat
2 plastic layer
3 fleece/fabric
4 first side
5 undercut
6 indentation
7 second side
8 cavity
9 projection
10 corner region
11 bottom
12 weakening zone
13 through hole
14 substrate
15 slab covering
16 thin bed mortar
17 recess
18 cable
$B_{min}$ minimum width
$H_{max}$ maximum height
d thickness
V vertical
L longitudinal direction
Q transverse direction

I claim:

1. An uncoupling mat (1), comprising:
   a flexible plastic layer (2) made of a film-like plastic with structuring that defines indentations (6) provided with undercuts (5) on a first, top side (4) and cavities (8) positioned between the indentations (6) on an opposite second, bottom side (7), and
   a fleece or fabric (3) securely connected to the second side (7) and covering the cavities (8)
   the plastic layer including a plurality of weakening zones (12) which each extend between two rows of indentations (6) in a straight line and continuously between opposing side edges of the plastic layer (2) and allow the plastic layer (2) to move substantially transversely to the direction of extension of the weakening zones; wherein
   a cross-section of the indentations (6) in at least some corner regions (10) increases towards the first, top side (4) from the second, bottom side (7) of the corresponding indentation (6).

2. The uncoupling mat (1) according to claim 1, wherein the weakening zones (12) comprise grooves.

3. The uncoupling mat (1) according to claim 1, wherein the plastic layer (2) has a substantially constant thickness (d), a thickness in the weakening zones being smaller than the thickness (d).

4. The uncoupling mat (1) according to claim 1, wherein at least some of a first group of weakening zones (12) extend parallel to one another, said parallel weakening zones extending transversely to a longitudinal direction of the uncoupling mat (1).

5. The uncoupling mat (1) according to claim 4, wherein at least some of a second group of weakening zones (12) extend parallel to one another, the second group of parallel weakening zones crossing the first group of parallel weakening zones at right angles.

6. The uncoupling mat (1) according to claim 1, wherein the weakening zones (12) are arranged spaced apart from one another equally at distances being in the range of from 10 to 100 mm.

7. The uncoupling mat (1) according to claim 6, wherein the weakening zones (12) are spaced at distances being in the range of from 10 to 50 mm.

8. The uncoupling mat (1) according to claim 1, wherein the fleece of fabric (3) has through holes (13) with a cross-section in the range of from 0.5 to 1.0 mm².

9. The uncoupling mat (1) according to claim 8, wherein the through holes (13) include a cross-section in the range of from 0.5 to 0.8 mm².

10. The uncoupling mat according to claim 1, wherein the cavities (8) cross one another and define a grid- or net-like arrangement.

11. The uncoupling mat according to claim 1, wherein the indentations (6) cross one another and define a grid- or net-like arrangement.

12. The uncoupling mat according to claim 11, wherein the mat includes 100 to 3000 cavities (8) per square meter.

13. The uncoupling mat (1) according to claim 12, wherein the cavities (8) at least partially have an annular cross-section.

14. The uncoupling mat (1) according to claim 13, wherein the indentations (6) have a minimum width ($B_{min}$) in the range of from 3 to 20 mm.

15. The uncoupling mat (1) according to claim 1, wherein the indentations (6) have a minimum width ($B_{min}$) in the range of from 3 to 20 mm and a maximum height ($H_{max}$) in the range of from 2 to 20 mm.

16. The uncoupling mat according to claim 1, wherein at least some of a first group of weakening zones extend parallel to one another, said parallel weakening zones extending transversely to a longitudinal direction of the uncoupling mat.

17. The uncoupling mat according to claim 4, wherein at least some of a second group of weakening zones extend parallel to one another, the second group of parallel weakening zones crossing the first group of parallel weakening zones at right angles.

18. An uncoupling mat (1), comprising:
   a flexible plastic layer made of a film-like plastic with structuring that defines indentations provided with undercuts on the first, top side and cavities positioned between the indentations on the opposite second, bottom side;
   a fleece or fabric securely connected to the second side and covering the cavities;
   the plastic layer including a plurality of weakening zones which each extend between two rows of indentations in a straight line and continuously between opposing side edges of the plastic layer and allow the plastic layer to move substantially transversely to the direction of extension of the weakening zones; and the plastic layer having a substantially constant thickness, with a thickness in the region of the weakening zones being smaller than the substantially constant thickness.

19. The uncoupling mat according to claim 18, wherein a cross-section of the indentations in at least some corner regions increases towards the top side from the bottom side of the corresponding indentation.

20. An uncoupling mat, comprising:
a flexible plastic layer made of a film-like plastic with structuring extending down from a top surface of the film-like plastic that define indentations provided with undercuts on a first, top side and cavities positioned between the indentations on an opposite second, bottom side;
a fleece or fabric securely connected to the second side and covering the cavities;
the plastic layer including a plurality of weakening zones formed in the top surface of the film-like plastic, which each extend between two rows of indentations in a straight line and continuously between opposing side edges of the plastic layer and allow the plastic layer to move substantially transversely to the direction of extension of the weakening zones;

at least some of a first group of weakening zones extend parallel to one another across the top surface of the film-like plastic, said parallel weakening zones extending transversely to a longitudinal direction of the uncoupling mat; and at least some of a second group of weakening zones extend parallel to one another across the top surface of the film-like plastic, the second group of parallel weakening zones intersecting the first group of parallel weakening zones at right angles.

* * * * *